United States Patent
Kogure et al.

(10) Patent No.: US 6,922,617 B2
(45) Date of Patent: Jul. 26, 2005

(54) VEHICLE CONTROL DEVICE AND VEHICLE CONTROL METHOD

(75) Inventors: Masaru Kogure, Tokyo (JP); Koji Matsuno, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/971,020

(22) Filed: Oct. 25, 2004

(65) Prior Publication Data

US 2005/0090943 A1 Apr. 28, 2005

(30) Foreign Application Priority Data

Oct. 27, 2003 (JP) ....................................... 2003-365529

(51) Int. Cl.$^7$ ............................................... G06F 7/00
(52) U.S. Cl. ............................. 701/1; 701/36; 701/41; 701/45; 701/70; 701/82; 701/91
(58) Field of Search ................................. 701/1, 36, 37, 701/38, 45, 41, 42, 51, 53, 54, 70, 71–74, 78, 79, 81, 82, 83, 84, 91, 93; 303/139–155, 165; 180/197

(56) References Cited

U.S. PATENT DOCUMENTS

| | | | | |
|---|---|---|---|---|
| 5,735,584 A | * | 4/1998 | Eckert | 303/140 |
| 5,742,507 A | * | 4/1998 | Eckert | 701/70 |
| 5,758,305 A | * | 5/1998 | Otsubo et al. | 701/71 |
| 5,774,821 A | * | 6/1998 | Eckert | 701/78 |
| 5,862,503 A | * | 1/1999 | Eckert et al. | 701/78 |
| 6,085,133 A | * | 7/2000 | Keuper et al. | 701/37 |
| 6,508,102 B1 | * | 1/2003 | Margolis et al. | 73/8 |
| 6,549,842 B1 | * | 4/2003 | Hac et al. | 701/80 |
| 6,648,426 B1 | * | 11/2003 | Boettiger et al. | 303/146 |
| 6,766,239 B2 | * | 7/2004 | Barron et al. | 701/71 |

FOREIGN PATENT DOCUMENTS

| | | |
|---|---|---|
| JP | 62-275814 | 11/1987 |
| JP | 4-331336 | 11/1992 |
| JP | 8-2274 | 1/1996 |
| JP | 11-102499 | 4/1999 |
| JP | 2003-132190 | 5/2003 |

* cited by examiner

Primary Examiner—Richard M. Camby
Assistant Examiner—Thomas G. Black
(74) Attorney, Agent, or Firm—McGinn & Gibb, PLLC

(57) ABSTRACT

An estimating unit 7 estimates an element aij of a system matrix based on state quantity including at least a longitudinal force Fx applied to a wheel, a vertical force Fz applied to the wheel and a vehicle speed V. A setting unit 8 sets a target value aij' regarding the element aij of the system matrix. A processing unit 9 calculates a control value so that the estimated element aij approaches the set target value aij'. Controlling units 10 to 13 control a vehicle based on the calculated control value. Here, the element aij is expressed by a sum of a linear term changing with linearity of the wheel and a nonlinear term changing with nonlinearity of the wheel, and the setting unit 8 sets the linear term of the element aij as the target value aij'.

26 Claims, 6 Drawing Sheets

VEHICLE CONTROL DEVICE AND VEHICLE CONTROL METHOD

BACKGROUND OF THE INVENTION

1. Field of the Invention

The present invention relates to a vehicle control device and a vehicle control method for controlling a motion state of a vehicle, and particularly relates to a method of controlling the motion state of the vehicle by adjusting an element of a system matrix in a state equation that represents the motion state of the vehicle.

2. Description of the Related Art

There has been hitherto known a vehicle control method for controlling a motion state of a vehicle by controlling a driving/braking torque applied to a wheel or by controlling a suspension performance of the wheel. According to this vehicle control method, the motion state of the vehicle is controlled to be optimized, for instance, under a driving condition such as cornering, in order to enhance steering stability. Such technologies include a vehicle control device that controls the motion state of the vehicle with use of a wheel-frictional-force utility factor (see the JP-3132190, for example). This vehicle control device obtains the wheel-frictional-force utility factor for each wheel, and controls a wheel state of each wheel such that the wheel-frictional-force utility factor approaches a target wheel-frictional-force utility factor. The wheel-frictional-force utility factor is calculated as a percentage of an actual frictional force that is a resultant force of a longitudinal force and a lateral force that are actually being generated between a wheel and a road surface, to the maximum frictional force that is a product of an actual friction coefficient between the wheel and the road surface and a vertical force actually being generated between the wheel and the road surface.

In addition, the JP-A-11-102499 discloses a method of controlling a motion state of a vehicle by focusing on an element of a matrix in a state equation that represents the motion state of the vehicle, based on knowledge that the element affects characteristic of the vehicle.

SUMMARY OF THE INVENTION

The present invention has an object to provide a novel method of controlling a motion state of a vehicle based on an element of a matrix in a state equation.

Another object of the present invention is to enhance steering stability of a vehicle by stabilizing a motion state of a vehicle regardless of a driving condition.

In order to solve such problems, a first invention provides a vehicle control device for controlling a motion state of a vehicle including an estimating unit estimating an element of a system matrix in a state equation that represents the motion state of the vehicle, based on state quantity including at least a longitudinal force applied to a wheel, a vertical force applied to the wheel and a vehicle speed, a setting unit setting a target value regarding the element of the system matrix, a processing unit calculating a control value so that the estimated element approaches the set target value, and a controlling unit controlling the vehicle based on the calculated control value. In the vehicle control device, the element is expressed by a sum of a linear term changing with linearity of the wheel and a nonlinear term changing with nonlinearity of the wheel, and the setting unit sets the linear term of the element as the target value.

In the first invention, it is preferred that the processing unit calculates the control value so that the state quantity changes from its current value.

Additionally, it is preferred in the first invention that the processing unit decides the control value so that an absolute value of the nonlinear term becomes its minimum value. Here, it is preferred that the nonlinear term of the element is expressed by a linear sum of at least a first term that has a first coefficient including the state quantity and a variable of a yaw rate and a second term that has a second coefficient including the state quantity and a variable of a body sliding angle, and the processing unit calculates the control value so that at least one of the first coefficient and the second coefficient approaches zero. This processing unit preferably calculates one of a driving-force distribution ratio and a braking-force distribution ratio of predetermined front and rear wheels as the control value so that a longitudinal-force distribution ratio of the front and rear wheels changes from its current value. Alternatively, the processing unit preferably calculates a vertical-load distribution ratio of predetermined front and rear wheels as the control value so that a vertical-force distribution ratio of the front and rear wheels changes from its current value. Furthermore, it is preferred that the processing unit calculates a vehicle speed different from its current value as the control value.

Additionally, it is preferred in the first invention that the processing unit calculates the control value so that an interpolated term is generated in the element for balancing out a variable component corresponding difference between the element and its target value. This processing unit preferably calculates one of the driving-force distribution ratio and the braking-force distribution ratio of predetermined left and right wheels as the control value so that the longitudinal-force distribution ratio of the left and right wheels changes from its current value.

A second invention provides a vehicle control method for controlling a motion state of a vehicle including a first step of estimating an element of a system matrix in a state equation that represents the motion state of the vehicle, based on state quantity including at least a longitudinal force applied to a wheel, a vertical force applied to the wheel and a vehicle speed, a second step of setting a target value regarding the element of the system matrix, a third step of calculating a control value so that the estimated element approaches the set target value, and a fourth step of controlling the vehicle based on the calculated control value. In this vehicle control method, the element is expressed by a sum of a linear term changing with linearity of the wheel and a nonlinear term changing with nonlinearity of the wheel, and the second step includes a step of setting the linear term of the element as the target value.

It is preferred in the second invention that the third step includes a step of calculating the control value so that the state quantity changes from its current value. Additionally, the third step preferably includes a step of deciding the control value so that an absolute value of the nonlinear term becomes its minimum value.

Additionally, it is preferred in the second invention that the nonlinear term of the element is expressed by a linear sum of at least a first term that has a first coefficient including the state quantity and a variable of a yaw rate and a second term that has a second coefficient including the state quantity and a variable of a body sliding angle, and the third step includes a step of calculating the control value so that at least one of the first coefficient and the second coefficient approaches zero.

Furthermore, it is preferred in the second invention that the third step includes a step of calculating the control value so that an interpolated term is generated in the element for balancing out a variable component corresponding to difference between the element and its target value.

DESCRIPTION OF PREFERRED EMBODIMENT

First Embodiment

Figure 1:
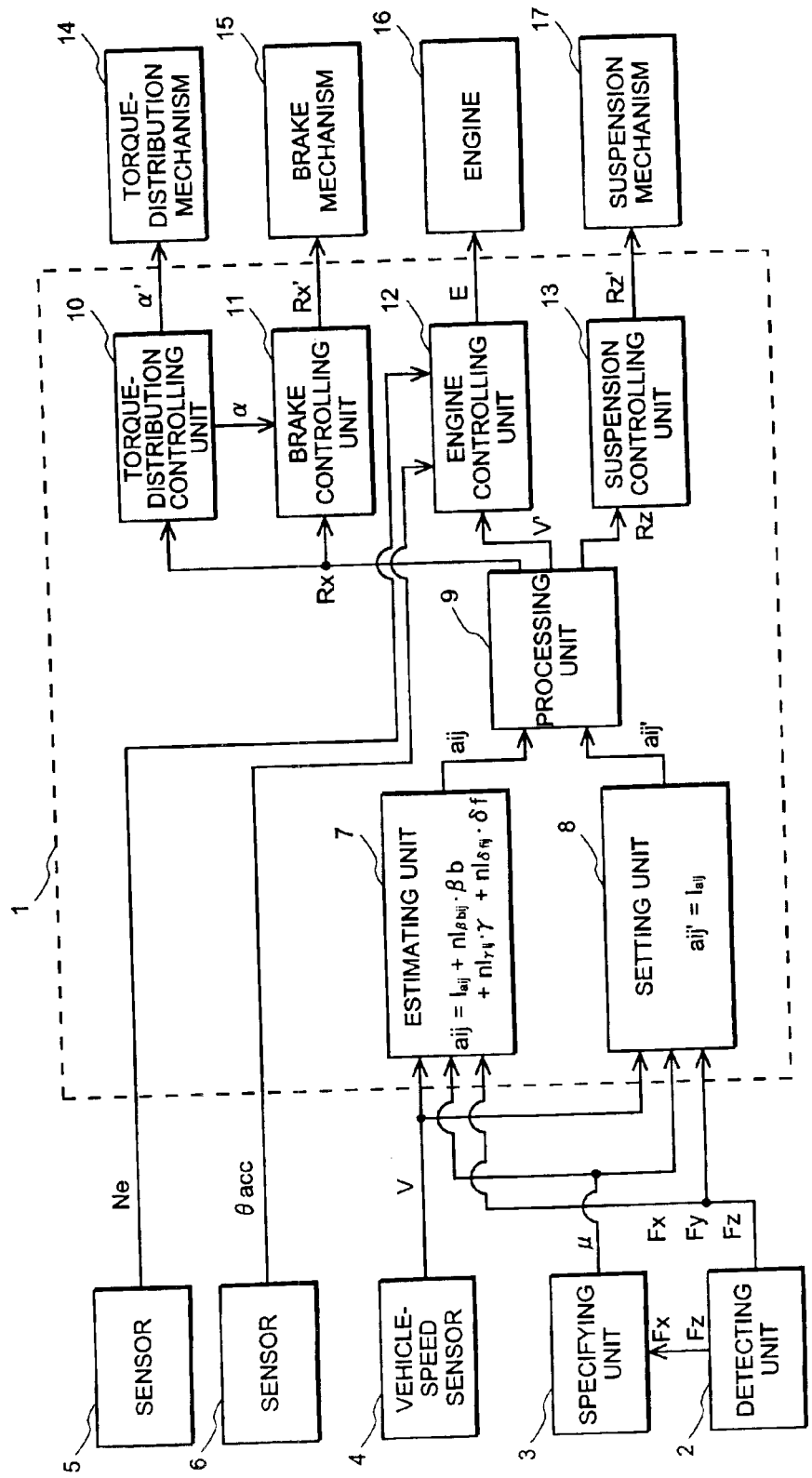
FIG. 1 is a block diagram showing an overall construction of a vehicle control device according to the present embodiment.

FIG. 1 is a block diagram showing an overall construction of a vehicle control device according to the present embodiment. The vehicle control device 1 calculates control values of a vehicle such as a driving-force distribution ratio or a braking-force distribution ratio to front and rear wheels, a vertical-load distribution ratio to the front and rear wheels or a vehicle speed, based on a current motion state of a vehicle. Subsequently, the vehicle control device 1 changes a longitudinal force applied to a wheel, a vertical force applied to the wheel or the vehicle speed by controlling the vehicle based on the calculated control values. This vehicle control device 1 determines the control values by focusing on an element of a system matrix in a state equation that represents the motion state of the vehicle. For clarifying the concept of vehicle control according the present embodiment, the system matrix in the state equation will be described first, followed by concrete description about a system construction and system process of the vehicle control device 1.

Figure 2:
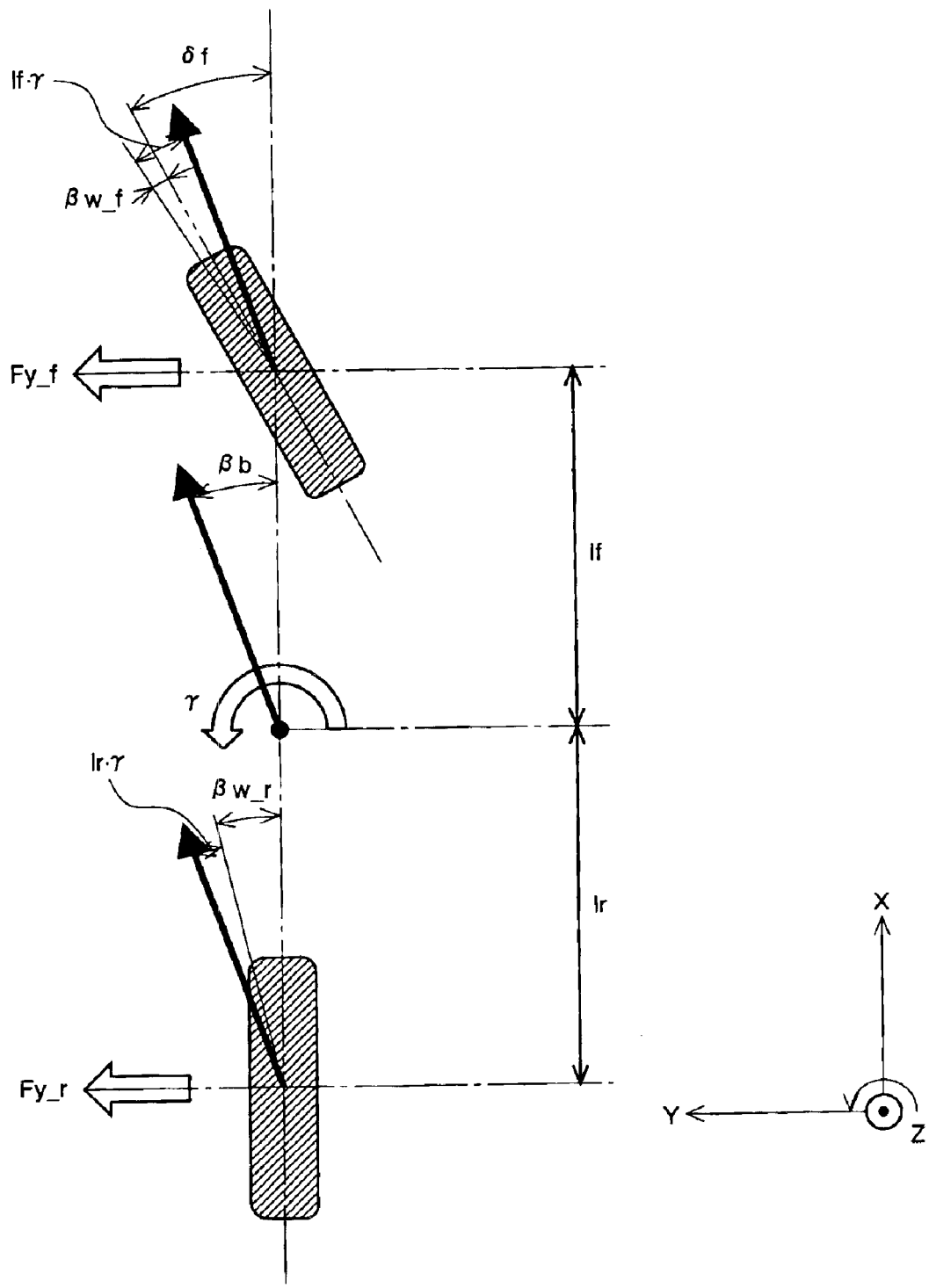
FIG. 2 is a schematic diagram showing a vehicle model.

Hereinafter, the state equation representing the motion state of the vehicle will be described. FIG. 2 is a schematic diagram showing a vehicle model. This vehicle model is a two-wheel model considering only freedom of rotational motion (yaw motion) around a vertical axis (Z-axis) and translational motion in a lateral direction (Y-axis direction) assuming that the vehicle is traveling at a constant speed in an X-axis direction. In this vehicle model, the motion state of the vehicle is expressed by a state equation described in an equation 1 when steering a front wheel (a rear wheel is parallel to the X-axis direction).

$$\begin{pmatrix} \beta b' \\ \gamma' \end{pmatrix} = \begin{pmatrix} -a11 & -a12 \\ -a21 & -a22 \end{pmatrix} \begin{pmatrix} \beta b \\ \gamma \end{pmatrix} + \begin{pmatrix} b1 \\ b2 \end{pmatrix} \delta f \quad \text{[Equation 1]}$$

In the equation 1, "βb", "βb'", "γ", "γ'" and "δf" represent a body-sliding angle, a body-sliding-angle speed, a yaw rate, a yaw-angle acceleration and a steering angel of a front wheel respectively. The state equation described in the equation 1 can be expressed by a block diagram shown in FIG. 3. This block diagram includes a block whose element is integration represented by "1/S", and shows time-series change in the state equation. In the equation 1, the matrix whose elements are a11~a22 is called a system matrix of the state equation, where the elements a11~a22 of the system matrix and b1, b2 satisfy an equation 2 (formulas (a)~(f)).

[Equation 2]

$$a11 = \frac{2(ka\_f + ka\_r)}{M \cdot V} \quad (a)$$

$$a12 = 1 + \frac{2(lf \cdot ka\_f - lr \cdot ka\_r)}{M \cdot V^2} \quad (b)$$

$$a21 = \frac{2(lf \cdot ka\_f - lr \cdot ka\_r)}{Iz} \quad (c)$$

$$a22 = \frac{2(lf^2 \cdot ka\_f + lr^2 \cdot ka\_r)}{Iz \cdot V} \quad (d)$$

$$b1 = \frac{2lf \cdot ka\_f}{M \cdot V} \quad (e)$$

$$b2 = \frac{2lf \cdot ka\_f}{Iz} \quad (f)$$

In the equation 2, "V", "M", "lf", "lr" and "Iz" represent a vehicle speed, a vehicle weight, a distance between a front wheel and a center of gravity, a distance between a rear wheel and the center of gravity and a moment of inertia of the vehicle around the Z-axis, respectively. Further, "ka_f" and "ka_r" are a cornering power ka of the front wheel and a cornering power ka of the rear wheel respectively.

Here, the cornering power ka is a rate of change in a cornering force that is a component force of a frictional force being generated at a ground plane while a wheel is turning with some sliding angle βw, to minute change in a wheel sliding angle βw, where the component force is generated in a direction perpendicular to a wheel traveling direction. That is, the cornering power ka can be defined as inclination (a derivative value) of the cornering force at some wheel sliding angle βw. Thus, the cornering power ka can be uniquely derived based on relationship between the wheel sliding angle βw and the cornering force. This cornering power ka is a parameter having a large effect on the steering stability of the vehicle. The larger the cornering power ka is, the faster response to behavioral change is, and the smaller the cornering power ka is, the slower the response to the behavioral change is.

Figure 4:
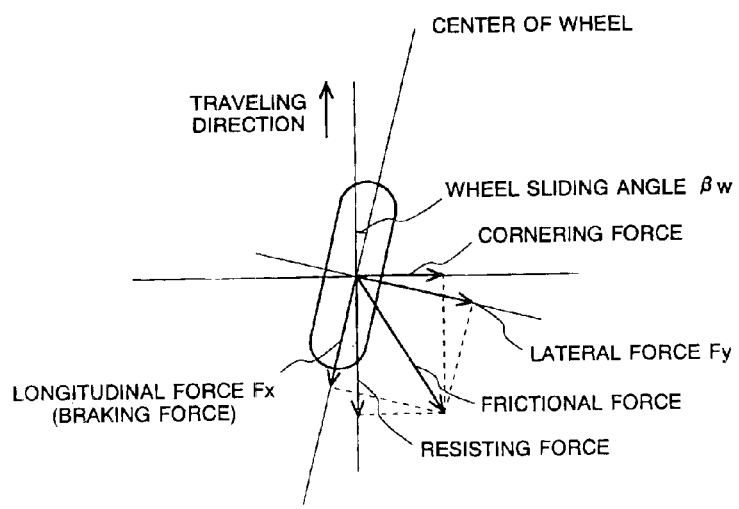
FIG. 4 is a schematic diagram showing action forces applied to a wheel.

FIG. 4 is a schematic diagram showing action forces applied to a wheel. As shown in FIG. 4, the action forces regarding the wheel include a longitudinal force Fx and a lateral force Fy besides the above-described cornering force. When the wheel turns at some sliding angle βw, a frictional force is generated on a ground plane. A component force of the frictional force being generated in a direction parallel to a longitudinal plane of the wheel corresponds to the longitudinal force Fx. A component force of the frictional force being generated in a direction perpendicular to the longitudinal plane of the wheel corresponds to the lateral force Fy. Additionally, the action forces regarding the wheel further include a load in a vertical direction, so-called a vertical force Fz not shown in the drawing.

The cornering force and the lateral force Fy can be handled as relatively similar forces among the forces included in the action forces. The values of the cornering force and the lateral force Fy do not correspond to each other in a precise sense. However, both the values are practically approximate to each other within the range of the wheel sliding angle βw the vehicle can take. In this specification, the cornering power ka is determined based on the lateral force Fy, assuming that the cornering force and the lateral force Fy are regarded as being substantially equal to each other. Accordingly, the relationship between the lateral force Fy and the cornering power ka will be examined below.

Both the wheel sliding angle βw and the lateral force Fy applied to the wheel satisfy the following equation 3.

$$Fy = k \cdot \beta w - \frac{k^2}{4 F y \max} \cdot \beta w^2 \qquad \text{[Equation 3]}$$

The equation 3 is an equation in which quadratic approximation is applied to the lateral force Fy applied to the wheel using the wheel sliding angle βw, based on a tire model representing mechanical characteristics of the wheel. In the equation 3, the coefficient "k" is a constant number acquired through experiments, and varies with a friction coefficient μ between the wheel and the road surface and the vertical force Fz (see an equation 4).

$$k = \left. \frac{Fy}{d\beta w} \right|_{\beta w = 0} \qquad \text{[Equation 4]}$$

This coefficient k is a value representing a characteristic of a wheel. It implies that rigidity of the wheel is high if the value is high and the rigidity is low if the value is low. As is apparent from the equation 4, the coefficient k corresponds to inclination (a derivative value) of the lateral force Fy when the wheel sliding angle βw is "0". By assuming the lateral force Fy and the cornering force practically equal to each other, the coefficient k can be restated as inclination (a derivative value) of the cornering force when the wheel sliding angle βw is "0". In this case, the value of the coefficient k is equivalent to the cornering power itself, and thus the value shall be hereinafter referred to as a standard cornering power k.

A lateral-force maximum value Fymax corresponding to the maximum value the lateral force Fy can possibly take is calculated uniquely based on the vertical force Fz, the longitudinal force Fx and the friction coefficient μ, as shown in an equation 5.

$$Fy\max = \sqrt{\mu^2 \cdot Fz^2 - Fx^2} \qquad \text{[Equation 5]}$$

Additionally, by assuming the cornering force and the lateral force Fy equal to each other, the cornering power ka can be restated as inclination (a derivative value) of the lateral force Fy when the wheel sliding angle βw is set to some value. Accordingly, the cornering power ka is expressed by an equation 6 by differentiating the equation 3 with the wheel sliding angle βw.

$$ka = k - \frac{k^2}{2 F y \max} \cdot \beta w \qquad \text{[Equation 6]}$$

As apparent from the equations 3 to 6, the wheel sliding angle βw is specified uniquely based on values of the longitudinal force Fx, lateral force Fy and the vertical force Fz that are applied to the wheel, and the friction coefficient μ if the values are given. Once the wheel sliding angle βw is specified, the cornering power ka of the wheel can be derived uniquely based on the relationship between the wheel sliding angle βw and the lateral force Fy.

Here, the system matrix will be described with reference to FIG. 3 and the equation 2. Values of the elements a11~a22 of the system matrix are determined based on the characteristics of the vehicle. The elements a11 and a22 are parameters that significantly affect the stability (easiness of converging the behavior) of the vehicle, and are called diagonal elements of the system matrix. In concrete, the element a11 stabilizes a lateral motion autonomously. The element a22 stabilizes a yaw motion autonomously. In addition, the elements a12 and a21 are parameters that significantly affect response (easiness of vibrating the behavior) of the vehicle, and are called coupled elements of the system matrix. The stability of the vehicle is enhanced while driving at high speed by setting the values of the elements a12 and a21 relatively smaller than the values of the elements a11 and a22. On the other hand, the response of the vehicle to steering is enhanced by setting the values of the elements a12 and a21 relatively larger than the values of the elements a11 and a22. Further, the elements b1 and b2 are gain values to the vehicle motion resulted from steering by a driver, and are parameters adjustable by setting a steering gear ratio, etc. As described above, the elements a11~a22 represent basic characteristics of the vehicle compared to the elements b1 and b2, and thus vehicle control can be carried out by focusing on the elements a11~a22. In the present embodiment, it is considered an ideal vehicle that motion characteristics of the vehicle do not change significantly regardless of a change in the driving condition. Therefore, the vehicle control is carried out so that changes in the elements a11~a22 are inhibited.

First, factors affecting the changes in the elements a11~a22 should be clarified. The equation 2 can be restated as the following equation 7 (formulas (g)~(j)) by substituting the cornering power ka shown in the equation 6, that is, the cornering power ka_f of the front wheel and the cornering power ka_r of the rear wheel, for the formulas (a)~(d) of the equation 2.

[Equation 7]

$$a11 = \frac{2(k\_f + k\_r)}{M \cdot V} - \frac{1}{M \cdot V}\left(\frac{k\_f^2}{Fy\max\_f} + \frac{k\_r^2}{Fy\max\_r}\right) \cdot \beta b - \qquad (g)$$
$$\frac{1}{M \cdot V^2}\left(\frac{lf \cdot k\_f^2}{Fy\max\_f} + \frac{lr \cdot k\_r^2}{Fy\max\_r}\right) \cdot \gamma + \frac{k\_f^2}{M \cdot V \cdot Fy\max\_f} \cdot \delta f$$

$$a12 = 1 + \frac{2(lf \cdot k\_f - lr \cdot k\_r)}{M \cdot V^2} - \frac{1}{M \cdot V^2}\left(\frac{lf \cdot k\_f^2}{Fy\max\_f} - \frac{lr \cdot k\_r^2}{Fy\max\_r}\right) \cdot \beta b - \qquad (h)$$
$$\frac{1}{M \cdot V^3}\left(\frac{lf^2 \cdot k\_f^2}{Fy\max\_f} - \frac{lr^2 \cdot k\_r^2}{Fy\max\_r}\right) \cdot \gamma + \frac{lf \cdot k\_f^2}{M \cdot V^2 \cdot Fy\max\_f} \cdot \delta f$$

$$a21 = \frac{2(lf \cdot k\_f - lr \cdot k\_r)}{Iz} - \frac{1}{Iz}\left(\frac{lf \cdot k\_f^2}{Fy\max\_f} - \frac{lr \cdot k\_r^2}{Fy\max\_r}\right) \cdot \beta b - \qquad (i)$$
$$\frac{1}{Iz \cdot V}\left(\frac{lf^2 \cdot k\_f^2}{Fy\max\_f} + \frac{lr^2 \cdot k\_r^2}{Fy\max\_r}\right) \cdot \gamma + \frac{lf \cdot k\_f^2}{Iz \cdot Fy\max\_f} \cdot \delta f$$

$$a22 = \frac{2(lf^2 \cdot k\_f - lr^2 \cdot k\_r)}{Iz \cdot V} - \frac{1}{Iz \cdot V}\left(\frac{lf^2 \cdot k\_f^2}{Fy\max\_f} + \frac{lr^2 \cdot k\_r^2}{Fy\max\_r}\right) \cdot \beta b - \qquad (j)$$
$$\frac{1}{Iz \cdot V^2}\left(\frac{lf^3 \cdot k\_f^2}{Fy\max\_f} - \frac{lr^3 \cdot k\_r^2}{Fy\max\_r}\right) \cdot \gamma + \frac{lf^2 \cdot k\_f^2}{Iz \cdot V \cdot Fy\max\_f} \cdot \delta f$$

Here, "k_f" and "k_r" represent the standard cornering power k of the front wheel and the standard cornering power k of the rear wheel respectively. As apparent from the equation 7, the value of each element a11~a22 varies with state quantity of the vehicle including the vehicle speed V, the maximum value Fymax of the lateral force Fy applied to the wheel, that is, the longitudinal force Fx and the vertical force Fz, etc. In other words, a current value of each element a11~a22 can be estimated uniquely based on the current state quantity of the vehicle if it is specified.

Next, a structure of each element a11~a22 shown in the equation 7 will be clarified. Each term of the elements a11~a22 in the equation 7 is labeled with the term number 1 to 4 starting from the leftmost term. However, for the element a12, the leftmost term and the second term from the left are labeled together as the first term. The first term of each element a11~a22 is a formula that is the two-wheel model shown in the equation 2 expanded in the range of linearity of the wheel. This first term is called a linear term, where each linear term is described as $l_{aij}$ (i=1~2, j=1~2). The second term of each element a11~a22 is a nonlinear term that varies with the body sliding angle βb, and is hereinafter referred to as a βb term. Each βb term has a variable βb, and a coefficient $nl_{\beta bij}$ including the state quantity of the vehicle, that is, the vehicle speed V, the lateral-force maximum value Fymax_f of the front wheel and the lateral-force maximum value Fymax_r of the rear wheel. The third term of each element a11~a22 is a nonlinear term that varies with the yaw rate γ, and is hereinafter referred to as a γ term. Each γ term has a variable γ, and a coefficient $nl_{\gamma ij}$ including the state quantity of the vehicle, that is, the vehicle speed V, the lateral-force maximum value Fymax_f of the front wheel and the lateral-force maximum value Fymax_r of the rear wheel. The fourth term of each element a11~a22 is a nonlinear term that varies with the steering angle δf of the front wheel, and is hereinafter referred to as a δf term. Each δf term has a variable δf, and a coefficient $nl_{\delta fij}$ including the state quantity of the vehicle, that is, the vehicle speed V and the lateral-force maximum value Fymax_f of the front wheel. Restating each formula (g)~(j) of the equation 7 conforming the above-described rules derives each element a11~a22 expressed by a common structure shown in an equation 8.

$$aij = l_{aij} + nl_{\beta bij} \cdot \beta b + nl_{\gamma ij} \cdot \gamma + nl_{\delta fij} \cdot \delta f \quad \text{[Equation 8]}$$

As apparent from the equation 8, an element of the system matrix, that is, each element aij is expressed by a sum of a variational element (the linear term) whose factor is the linearity of the wheel and variational elements (the nonlinear terms including the βb term, the γ term and the δf term) whose factor is the nonlinearity of wheel. Thus, change in each element aij can be inhibited by inhibiting change in the linear term and/or the nonlinear term. If a value of each element aij changes because of change occurred only in the linear term, only an element whose factor is the linearity of the wheel is added to the vehicle behavior. Thus, such change is not acknowledged necessarily as a problem from the perspective of the steering stability. However, if the value of each element aij changes because of the change occurred in the nonlinear term, an element whose factor is the nonlinearity of the wheel is added to the vehicle behavior. As a result, the steering stability is lowered. Therefore, effects of the nonlinear term in each element aij should be reduced. That is, an absolute value of the nonlinear term in each element aij should be kept minimum so that each element aij approaches the linear term.

Here, the nonlinear terms including the βb term, the γ term and the δf term are focused. The βb term varies with its variable, the body sliding angle βb. The γ term varies with its variable, the yaw rate γ. The δf term varies with its variable, the steering angle δf of the front wheel. Accordingly, each element aij can be brought close to the linear term by reducing the body sliding angle βb, the yaw rate γ and the steering angle δf of the front wheel close to "0". However, the body sliding angle βb, the yaw rate γ and the steering angle δf of the front wheel are parameters varying with steering by a driver, the motion state of the vehicle, etc., and are hardly kept to "0".

In the present embodiment, the coefficients $nl_{\beta bij}$, $nl_{\gamma ij}$ and $nl_{\delta fij}$ of the nonlinear terms including the βb term, the γ term and the δf term are focused. Effects of the nonlinear term to the element aij can be reduced by minimizing the values of the coefficients $nl_{\beta bij}$, $nl_{\gamma ij}$ and $nl_{\delta fij}$ (minimization of the coefficients). Consequently, the absolute values of the nonlinear terms including the βb term, the γ term and the δf term are reduced close to their minimum values, and thus the element aij can be brought close to the linear term.

There exist factors changing the coefficients of the βb term, the γ term and the δf term, that are the lateral-force maximum value Fymax_f of the front wheel, the lateral-force maximum value Fymax_r of the rear wheel and the vehicle speed V. In particular, the coefficient $nl_{\beta bij}$ of the βb term and the coefficient $nl_{\gamma ij}$ of the γ term vary with the lateral-force maximum value Fymax_f of the front wheel and the lateral-force maximum value Fymax_r of the rear wheel. The coefficient $nl_{\delta fij}$ of the δf term varies with the lateral-force maximum value Fymax_f of the front wheel. Each coefficient $nl_{\beta bij}$, $nl_{\gamma ij}$, $nl_{\delta fij}$ can be minimized by properly changing the values of the longitudinal force Fx and the vertical force Fz for the front and rear wheels since the lateral-force maximum value Fymax varies with the value of the longitudinal force Fx or the vertical force Fz. This longitudinal force Fx is the state quantity whose value is adjustable by changing the value of the driving force or the braking force. The vertical force Fz is the state quantity whose value is adjustable by changing the value of the vertical load. Correspondingly, the vehicle speed V is a denominator of the linear term and the nonlinear term. Thus, the value of each element aij is possibly brought close to the linear term by changing the value of the vehicle speed V. However, adjusting the vehicle speed V may cause a situation in which driver's operation (acceleration, for example) and control operation (deceleration) conflict against each other. In such situation, a driver may experience discomfort. Accordingly, adjustment of the vehicle speed V is used as the final means in a case that the stability of the vehicle is not maintained, for instance.

Assuming that the driving force or the braking force is constantly applied to the wheels of a general vehicle equipped with four wheels, the sum of the longitudinal force Fx applied to each wheel stays constant. Therefore, there exists a problem that changing only one of the longitudinal forces Fx applied to the front and rear wheels is hardly achieved, since decreasing the longitudinal force Fx applied to a wheel increases the longitudinal force Fx applied to the other wheel. In order to resolve such problem, minimization of the coefficients is achieved by changing the longitudinal forces Fx applied to the front and real wheels with use of a longitudinal-force distribution ratio "rx" (rx: the longitudinal force Fx applied to a front wheel/the longitudinal force Fx applied to a rear wheel) in the present embodiment. In addition, in a case that the vertical load is constantly applied to the wheels, the sum of the vertical force Fz applied to each wheel stays constant. Thus, minimization of the coefficients is achieved by changing the vertical forces Fz applied to the front and real wheels with use of a vertical-force distribution ratio "rz" (rz: the vertical force Fz applied to a front wheel/the vertical force Fz applied to a rear wheel). It should be noted that the value of the coefficient $nl_{\delta fij}$ of the δf term could be changed only by the lateral-force maximum value Fymax_f of the front wheel, that is, the longitudinal force Fx or the vertical force Fz of the front wheel. Hence, minimization of the coefficient is performed with the coefficient $nl_{\beta bij}$ of the βb term and the coefficient $nl_{\gamma ij}$ of the γ term of the nonlinear terms set to processing objects in the present embodiment.

Setting the lateral-force-maximum-value ratio to the front and real wheels as "r", the lateral-force maximum value Fymax_f of the front wheel and the lateral-force maximum value Fymax_r of the rear wheel are expressed as the following equation 9.

$$\frac{F\text{ymax\_f}}{F\text{ymax\_r}} = \frac{\sqrt{\mu^2 \cdot Fz\_f^2 - Fx\_f^2}}{\sqrt{\mu^2 \cdot Fz\_r^2 - Fx\_r^2}} = r \quad \text{[Equation 9]}$$

A value of the lateral-force-maximum-value ratio r is obtained so that values of the coefficient $nl_{\beta bij}$ of the βb term and the coefficient $nl_{\gamma ij}$ of the γ term in each element aij is brought close to "0" even though the values hardly become "0". Accordingly, minimization of the coefficients is performed. This method enables bringing the element aij to the linear term by reducing an effect of the nonlinear term, since the coefficient $nl_{\beta bij}$ of the βb term and the coefficient $nl_{\gamma ij}$ of the γ term approach "0".

In particular, the longitudinal-force distribution ratio rx or the vertical-force distribution ratio rz satisfying an equation 10 is obtained based on a value of the lateral-force-maximum-value ratio r according to the coefficient $nl_{\beta bij}$, $nl_{\gamma ij}$ that are to be minimized. The distribution ratios rx, rz can be obtained uniquely by executing a prescribed numerical operation. However, this method involves a complicated operation that leads to complication of processing. Accordingly, the longitudinal-force distribution ratio rx or the vertical-force distribution ratio rz may be obtained by using convergent calculation, etc.

$$\frac{\mu^2 \cdot Fz\_f^2 - Fx\_f^2}{\mu^2 \cdot Fz\_r^2 - Fx\_r^2} = \alpha^2 \cdot \frac{k\_f^4}{k\_r^4} \left( \alpha^2 = 1, \frac{lf^2}{lr^2}, \frac{lf^4}{lr^4}, \frac{lf^6}{lr^6} \right) \quad \text{[Equation 10]}$$

By setting $\alpha^2$ to "1" in the equation 10, the distribution ratios rx and rz are specified such that the coefficient of the βb term in the element a11 is minimized. By setting $\alpha^2$ to "lf²/lr²", the distribution ratios rx and rz are specified such that the coefficient of the γ term in the element a11, the βb term in the element a12 or the βb term in the element a21 is minimized. By setting $\alpha^2$ to "lf⁴/lr⁴", the distribution ratios rx and rz are specified such that the coefficient of the γ term in the element a12, the γ term in the element a21 or the βb term in the element a22 is minimized. Additionally, by setting $\alpha^2$ to "lf⁶/lr⁶", the distribution ratios rx and rz are specified such that the coefficient of the γ term in the element a22 is minimized.

After the longitudinal-force distribution ratio rx is calculated as described above, a driving-force distribution ratio Rx or a braking-force distribution ratio Rx is obtained for achieving the longitudinal-force distribution ratio rx. Subsequently, the value of the longitudinal force Fx is changed by controlling the vehicle based on the control value set to the driving-force distribution ratio Rx or the braking-force distribution ratio Rx, and thus the minimization of the coefficients is performed. Similarly, after the vertical-force distribution ratio rz is calculated based on the equation 10, a vertical-load distribution ratio Rz is obtained for achieving the vertical-force distribution ratio rz. Subsequently, the value of the vertical force Fz is changed by controlling the vehicle based on the control value set to the vertical-load distribution ratio Rz, and thus the minimization of the coefficients is performed.

Returning to FIG. 1, the system construction of the vehicle control device 1 according to the present embodiment will be described based on the above-described concept of the vehicle control. A microcomputer including a CPU, a RAM, a ROM, an input/output interface, etc. is used as the vehicle control device 1. The vehicle control device 1 performs calculation regarding the above-described control value, that is, the driving-force distribution ratio or the braking-force distribution ratio, the vertical-load distribution ratio or the vehicle speed V in accordance with a control program stored in the ROM. Subsequently, a control signal corresponding to the calculated control value is output to various actuators. The vehicle control device 1 obtains an action force applied to a wheel from a detecting unit 2, the friction coefficient μ between the wheel and the load surface from a specifying unit 3, the vehicle speed V of the vehicle from a vehicle-speed sensor 4 as its input for calculating the control value. The vehicle control device 1 also takes vehicle-state signals that are an engine rotational number and a throttle opening degree from sensors 5 and 6.

The detecting unit 2 includes at least one stress-detecting sensor, for example, a resistive strain gage mounted on a wheel shaft connected to the wheel and a signal-processing circuit that processes a detection signal provided by the stress-detecting sensor. This detecting unit 2 is equipped for each wheel, and outputs the action forces applied to each wheel to the vehicle control device 1. The detecting unit 2 detects the action forces through stresses based on knowledge that the stress generated on the wheel shaft due to the action force is proportional to the action force. The three action forces detected by the detecting unit 2 are the lateral force Fy, the longitudinal force Fx and the vertical force Fz. In FIG. 1, the detecting unit 2 is illustrated as one block for convenience. However, this block collectively represents every detecting unit 2 equipped for the respective wheels. The detailed construction of the detecting unit 2 is disclosed in JP-A-4-331336, and may be referred to if necessary.

The specifying unit 3 specifies the friction coefficient μ between the wheel and the road surface. In the present embodiment, the specifying unit 3 specifies the friction coefficient μ as the ratio between a road-surface frictional force, that is, the longitudinal force Fx and the vertical force Fz by using the output information from the above-described detecting unit 2. Alternatively, for specifying the friction coefficient μ, the specifying unit 3 may estimate the friction coefficient μ by using a well-known method instead of specifying the friction coefficient μ based on the output value from the detecting unit 2. A method of estimating the friction coefficient μ includes a method of comparing values of a current vehicle yaw rate, steering angle, lateral acceleration and vehicle speed with these values at various friction coefficients μ for estimation. One of such estimating methods is disclosed in JP-A-8-2274 proposed by the applicant of the present invention, and may be referred to if necessary. It should be noted that if the detecting unit 2 calculates the friction coefficient μ based on the detection result thereof, the specifying unit 3 shown in FIG. 1 may be omitted while the detecting unit 2 may include functions of the specifying unit 3.

Considering the microcomputer functionally, the vehicle control device 1 includes an estimating unit 7, a setting unit 8, a processing unit 9 and controlling units 10 to 13. The estimating unit 7 and the setting unit 8 read in the action forces detected for each wheel, the specified friction coefficient $\mu$ and the vehicle speed V. Subsequently, the estimating unit 7 estimates a current value of each element aij based on the read values (the state quantity of the vehicle) On the other hand, the setting unit 8 sets a target value aij' of each element aij based on the read values. The estimated element aij and the set target value aij' are output to the subsequent processing unit 9. The processing unit 9 determines whether the estimated element aij hereinafter referred to as an estimated element value is equivalent to the target value aij'. If it is determined that the estimated element value aij is different from the target value aij', the processing unit 9 decides the control value, for instance, the driving-force distribution ratio Rx or the braking-force distribution ratio Rx, the vertical-load distribution ratio Rz or the vehicle speed V so that each estimated element value aij is brought close to the corresponding target value aij'. Subsequently, the processing unit 9 outputs the control signal corresponding to the control value to one or a plurality of the controlling units to 13. The controlling units 10 to 13 control the vehicle by controlling the various actuators based on the control signal.

The controlling units 10 to 13 correspond to a torque-distribution controlling unit 10, a brake controlling unit 11, an engine controlling unit 12 and a suspension controlling unit 13 respectively. The controlling units 10 to 13 are selectively used in accordance with the state quantity of the vehicle that is to be changed.

(1) The longitudinal force Fx: For changing the value of the longitudinal force Fx, the processing unit 9 calculates the driving-force distribution ratio Rx or the braking-force distribution ratio Rx as the control value, and outputs a control signal corresponding to the control value to the torque-distribution controlling unit 10 or the brake controlling unit 11. The torque-distribution controlling unit 10 has a function to control a torque-distribution mechanism 14, for example, a center-differential device that can adjust torque distribution transferred to the front and rear wheels. This torque-distribution controlling unit 10 decides a controlled variable for the torque-distribution mechanism 14 based on the calculated driving-force distribution ratio Rx. The brake controlling unit 11 has a function to control a brake mechanism 15, for example, an ABS device, and decides a controlled variable for the brake mechanism 15 based on the calculated braking-force distribution ratio Rx.

(2) The vertical force Fz: For changing the value of the vertical force Fz, the processing unit 9 calculates the vertical-load distribution ratio Rz as the control value, and outputs a control signal corresponding to the control value to the suspension controlling unit 13. The suspension controlling unit 13 has a function to control a suspension mechanism 17, for example, an active suspension that can adjust vertical-load distribution regarding the front and rear wheels. This suspension controlling unit 13 decides a controlled variable for the suspension mechanism 17 based on the calculated vertical-load distribution ratio Rz.

(3) The vehicle speed V: For changing the value of the vehicle speed V, the processing unit 9 calculates the vehicle speed V as the control value, and outputs a control signal corresponding to the control value to the engine controlling unit 12. This engine controlling unit 12 has a function to control an engine 16, and decides a controlled variable for the engine 16 based on the calculated vehicle speed V.

Figure 5:
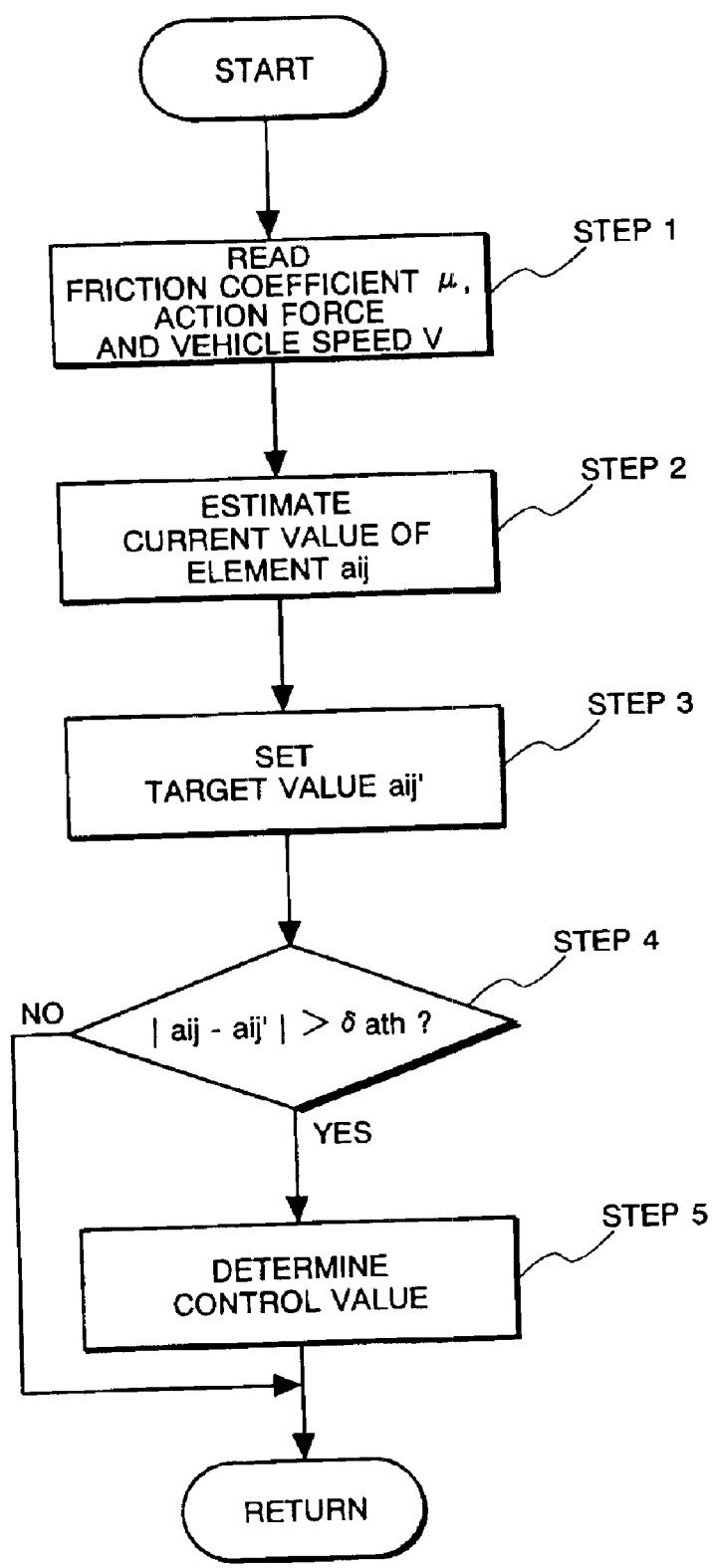
FIG. 5 is a flowchart showing a procedure of vehicle control according to the present embodiment.

FIG. 5 is a flowchart showing a procedure of the vehicle control according to the present embodiment. A routine shown in FIG. 5 is called at every predetermined interval and executed by the vehicle control device 1. Initially, in a step 1, the friction coefficient $\mu$, the action forces and the vehicle speed V are read in. In a step 2, a current value of the element aij, that is, the estimated element value aij is estimated based on the above-described equation 7 with the read state quantity of the vehicle. Subsequently, in a step 3, the target value aij' is set based on the read state quantity of the vehicle. This target value aij' is a value set for each of the elements aij, and corresponds to the linear term of each element aij (the first term in the equation 7).

In a step 4, an absolute value of difference between the estimated element value aij and the target value aij' is calculated. Then, it is determined whether the calculated value is larger than a predetermined reference value $\delta$ath. A reason for such determining process is that if the estimated element value aij and the target value aij' are close to each other, it may be assumed that the estimated element value aij is already brought close to the linear term, and thus changing the value of the element aij is unnecessary.

The reference value $\delta$ath is preset through an experiment or simulation, to the maximum value of difference (an absolute value) between the estimated element value aij and the target value aij' for the case of regarding both values substantially equal to each other. If the positive determination is made in the step 4, that is, if the difference between the estimated element valued aij and the target value aij' is larger than the reference value $\delta$ath, a process in a step 5 subsequent to the step 4 is performed. On the other hand, if the negative determination is made in the step 4, that is, if the difference between the estimated element valued aij and the target value aij' is smaller than or equal to the reference value $\delta$ath, the current routine is terminated skipping the step 5. It should be noted that if plural elements aij exist as the processing objects, difference between an element aij selected from the plural elements aij and the target value aij' corresponding to the selected element aij may be calculated and compared with the reference value $\delta$ath. Alternatively, an average value of the differences between the elements aij and their corresponding target values aij' may be calculated and compared with the reference value $\delta$ath.

In the step 5, the processing unit 9 calculates the longitudinal-force distribution ratio rx or the vertical-force distribution ratio rz that minimizes the coefficient of the nonlinear term in the element aij based on the equation 10. Subsequently, the processing unit 9 calculates the control value, for example, the driving-force distribution ratio Rx for achieving the calculated longitudinal-force distribution ratio rx based on the calculated longitudinal-force distribution ratio rx. The longitudinal-force distribution ratio rx is equal to the driving-force distribution ratio Rx, basically.

The torque-distribution controlling unit 10 determines whether a torque-distribution ratio a should be set so that a torque applied to the front wheel increases while a torque applied to the real wheel decreases, or the torque applied to the front wheel decreases while the torque applied to the real wheel increases compared to their current values. For example, if it is determined that the torque-distribution ratio a needs to be set so that the torque applied to the front wheel increases compared to its current value, a target torque-distribution ratio $\alpha$' is calculated by adding a predetermined step value to the current value of the torque-distribution ratio $\alpha$ so that the torque applied to the front wheel increases compared to its current value. Subsequently, the torque-distribution controlling unit 10 outputs a control signal corresponding to the target torque-distribution ratio $\alpha$' to the torque-distribution mechanism 14.

The torque-distribution mechanism 14 limits differential of the center-differential device in response to the control signal input from the torque-distribution controlling unit 10. Consequently, the torque distribution shifts from the front-wheel side to the real-wheel side, and vice versa, and thus the torque distribution approaches the longitudinal-force distribution ratio rx such that the longitudinal force Fx applied to the wheel satisfies the equation 10. As a result, the value of the element aij approaches the linear term, so change in its value is inhibited. The details regarding the torque-distribution control are disclosed for instance in JP-A-8-2274 already applied by the applicant of the present invention, and may be referred to if necessary.

As described above, according to the present embodiment, the vehicle is controlled focusing on the value of the element aij in the system matrix. Specifically, the vehicle is controlled so that the coefficients $nl_{\beta bij}$, $nl_{\gamma ij}$ and $nl_{\delta fij}$ of the nonlinear term in each element aij are minimized. Accordingly, the nonlinear term of the element aij is minimized, and thus the element aij reacts in a direction toward the linear term. Consequently, the motion state of the vehicle is stabilized regardless of its driving condition, since change in each element aij is inhibited. In addition, the steering stability of the vehicle is enhanced since a nonlinear element applied to the wheel is inhibited in response to minimization of the nonlinear term in the element aij. Especially, a vehicle having certain response regardless of its driving condition can be achieved by inhibiting changes in the elements a12 and a21. In contrast, a vehicle having certain stability regardless of its driving condition can be achieved by inhibiting changes in the elements a11 and a22.

In the above-described embodiment, the vertical-force distribution ratio rz is changed by varying the torque-distribution ratio a by the amount of the step value (a minute value) for prioritizing the control stability of the vehicle. Alternatively, the vehicle may be controlled so that the current value of the vertical-force distribution ratio rz becomes equivalent to the torque-distribution ratio a' that is calculated directly for satisfying the equation 10.

If controlling the state of the vehicle to achieve the longitudinal-force distribution ratio rx that satisfies the equation 10, the processing unit 9 may calculate the control value as the braking-force distribution ratio Rx based on a force opposing a driving force, that is, a barking force. In this case, a control signal corresponding to the braking-force distribution ratio Rx is output to the brake controlling unit 11. The brake controlling unit 11 decides a brake controlled variable Rx' for the front and rear wheels based on the braking-force distribution ratio Rx calculated by the processing unit 9. After a controls signal corresponding to the decided brake controlled variable Rx' is output to the brake mechanism 15, the brake mechanism 15 properly operates brakes for the front and rear wheels in response to the control signal. Accordingly, the longitudinal force Fx applied to each wheel approaches the longitudinal-force distribution ratio rx that satisfies the equation 10. Consequently, the element aij approaches the linear term, thus inhibiting change in its value.

In the foregoing description, the minimization of the coefficients is performed by adjusting the longitudinal-force distribution ratio rx of the front and rear wheels as the driving-force distribution ratio or the braking-force distribution ratio. However, the minimization of the coefficients may be performed by use of the vertical-force distribution ratio rz based on the concept described above. The steps of the related system process are the same as the process shown in FIG. 5 basically, and the detailed description thereof is omitted. The particular difference between the use of the longitudinal-force distribution ration rx and the use of the vertical-force distribution ratio rz resides in that the processing unit 9 calculates the vertical-load distribution ratio Rz by which the calculated vertical-force distribution ratio rz is achieved. Subsequently, the suspension controlling unit 13 determines whether the vertical-load distribution ratio Rz should be set so that a load applied to the front wheel increases while a load applied to the rear wheel decreases, or the load applied to the front wheel decreases while the load applied to the rear wheel increases compared to their current values, based on the calculated vertical-load distribution ratio Rz and the current value of the vertical-load distribution ratio Rz. If it is determined that the vertical-load distribution ratio Rz should be set so that the load applied to the front wheel increases compared to its current value, the suspension controlling unit 13 calculates a suspension controlled variable Rz' by which the vertical-load distribution ratio Rz is set so that the load applied to the front wheel compared to its current value by adding a predetermined step value to the current value of the vertical-load distribution ratio Rz. The suspension mechanism 17 shifts the vertical-load distribution from the front-wheel side to the rear-wheel side, and vice versa, by operating in response to a control signal corresponding to the suspension controlled variable Rz' output to the suspension mechanism 17. Accordingly, the vertical force Fz applied to the wheels reacts in a direction satisfying the equation 10, and thus the element aij approaches the linear term. The details regarding a method of controlling the vertical load applied to the wheel are disclosed in JP-A-62-275814, and may be referred to if necessary.

The minimization of the coefficients of the nonlinear term in the element aij may be performed by adjusting the vehicle speed V. The processing unit 9 calculates a target vehicle speed V different from the current value of the vehicle speed V, by which the estimated element value aij is converged to the target value aij', based on a PID control theory, for instance. Subsequently, the processing unit 9 outputs a control signal corresponding to the target vehicle speed V to the engine controlling unit 12. The engine controlling unit 12 estimates an engine power based on the engine rotational number and the throttle opening degree. Then, an engine power E satisfying the target vehicle speed V is calculated based on the current vehicle speed V and the estimated engine power. The engine controlling unit 12 controls the engine 16 to have the engine power E, thus changing the vehicle speed V. Accordingly, the element aij reacts in a direction toward the linear term, and thus the change in the element aij is inhibited. Controlling the vehicle speed V may be carried out by adjusting the braking force instead of the engine power.

The change in the element aij maybe inhibited by adjusting the state quantity of the vehicle such as the longitudinal-force distribution ratio rx, the vertical-force distribution ratio rz and the vehicle speed V by itself or with others. For example, the longitudinal-force distribution ratio rx is adjusted to inhibit the change in the element aij. If the adjustment does not bring the element aij close to the linear term, adjustment of the vertical-force distribution ratio rz is further performed. Obviously, in a case that the element aij does not approach the linear term sufficiently by the above-described adjustments, the vehicle speed V may be adjusted finally so that the element aij approaches the linear term.

Figure 6:
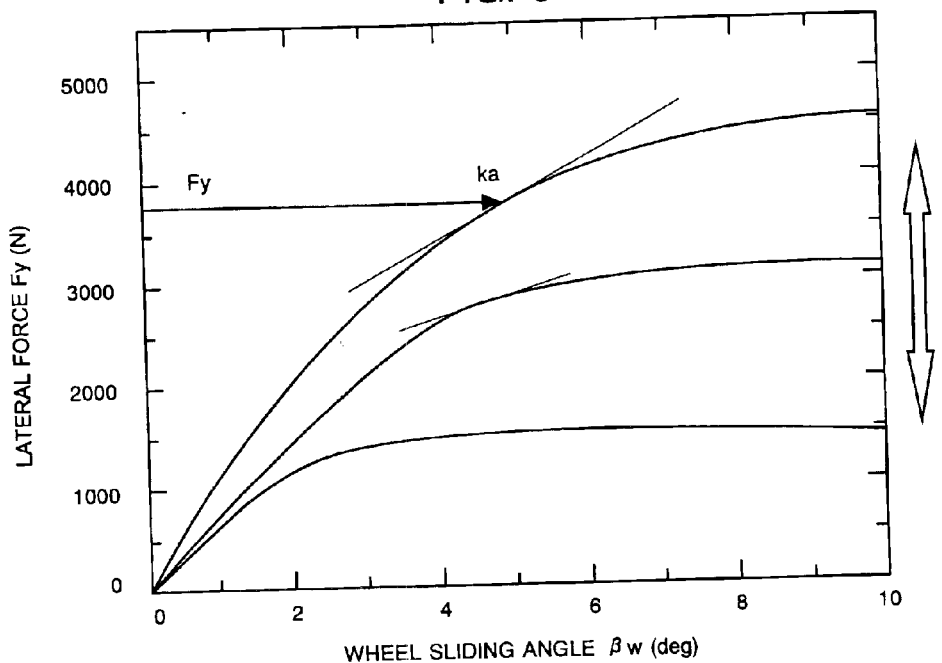
FIG. 6 is a diagram showing an example of a relationship between a wheel sliding angle and a lateral force calculated through experiments.

In the present embodiment, the relationship between the wheel sliding angle βw and the lateral force Fy is defined by applying the quadratic approximation with the tire model, however the present invention is not limited thereto. For example, the relationship between the wheel sliding angle βw and the lateral force Fy may be defined using tire characteristics derived from experiments under various conditions regarding the longitudinal force Fx, the vertical force Fz and the friction coefficient $\mu$ or using other numerical models such as a Fiala model. FIG. 6 is a diagram showing an example of the relationship between the wheel sliding angle βw and the lateral force Fy calculated through experiments. Even if using such values calculated through the experiments, the cornering power ka of the wheel is uniquely calculated as a rate or a derivative value of the lateral force Fy increasing with increase in the value of the wheel sliding angle βw, based on the relationship between the wheel sliding angle βw and the lateral force Fy.

The cornering power ka defined as the equation 6 in the above-described embodiment can be calculated simply as an equation 11.

$$kp = k - \frac{k^2}{4F_{y\max}} \cdot \beta w \quad \text{[Equation 11]}$$

A term "kp" indicated by the equation 11 is called a fictitious cornering power for distinguishing from the above-described cornering power ka. This fictitious cornering power kp indicates almost the same tendency as the cornering power ka shown in the equation 6. Hence, the fictitious cornering power kp may be substituted for the cornering power ka used in the above-described embodiment.

Because the detecting unit 2 described above directly detects the action forces applied to the wheel, the cornering power ka whose nonlinear element has a strong effect can be specified precisely. In consequence, the cornering power ka is specified precisely even in a driving condition such as critical cornering or driving on a road surface with a low-friction coefficient. Accordingly, estimation precision of the element aij is improved, and thus the motion state of the vehicle can be controlled more effectively.

Second Embodiment

The second embodiment is different from the first embodiment in a method of inhibiting change in the element aij. As a concrete characteristic of the second embodiment, the change in the nonlinear term of the element aij is inhibited by providing a term referred to as an interpolated term besides the linear term and the nonlinear term in the element aij.

A description will be given with reference to FIG. 3, again. If the value of the element aij is changed from the linear term as its target value due to increase in the vehicle speed or the nonlinear term, a yaw motion and a translational motion in a lateral direction hereinafter referred to as a lateral translational motion are further generated for the vehicle. Here, the yaw motion and the lateral translational motion correspond to a variable component of the element aij. The variable component of the element aij is interpolated by providing a yaw motion and a lateral translational motion to the vehicle, the motions balancing out the yaw motion and the lateral translational motion generated by the variable component respectively. Consequently, the element aij can be brought close to the linear term. The yaw motion can be adjusted by changing the driving-force distribution ratio to the left and right wheels and applying a yaw moment to the vehicle. On the other hand, the translational motion in the lateral direction can be adjusted only by turning the front and rear wheels in the same direction. In the present application, a description will be given about a method of inhibiting changes especially in the elements a12 and a22 by applying the easily adjustable yaw moment.

Figure 3:
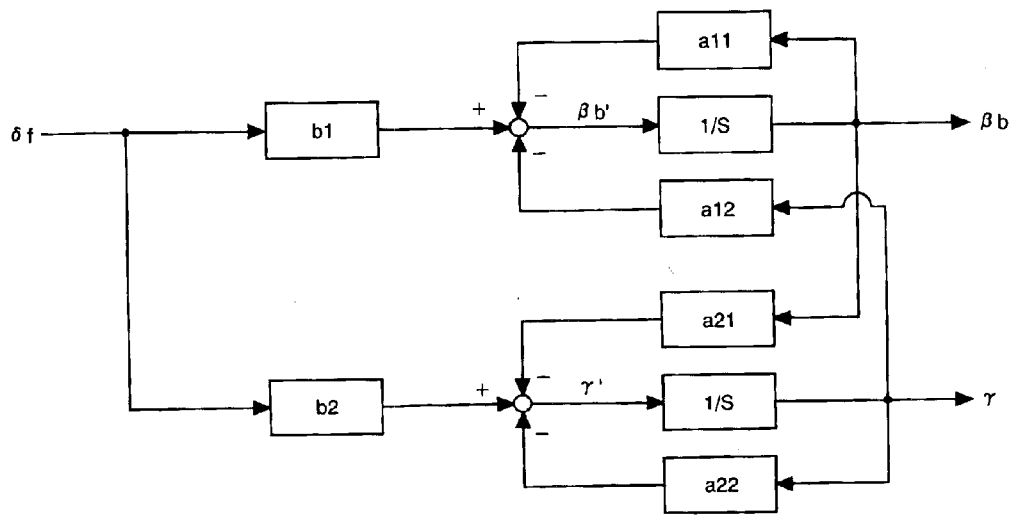
FIG. 3 is a block diagram showing a state equation.
Figure 7:
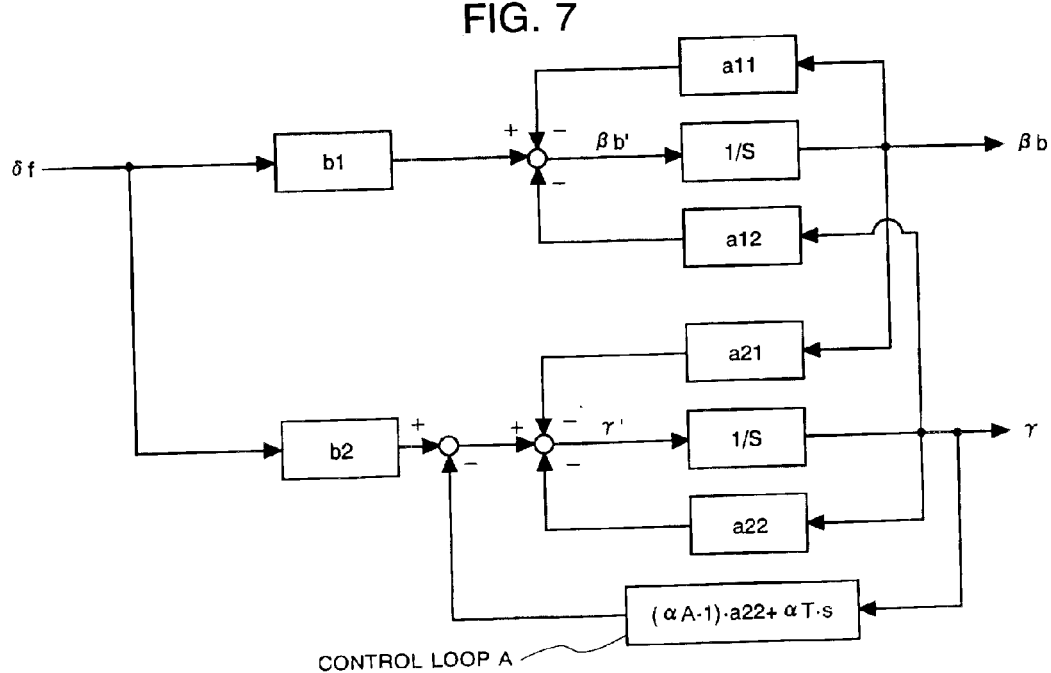
FIG. 7 is a block diagram showing a state equation to which a control loop is added.

Supposing the yaw moment is additionally given to the vehicle in the motion state shown in FIG. 3, the block diagram shown in FIG. 3 can be redrawn as a block diagram shown in FIG. 7 having a control loop A. In FIG. 7, a term "αA" represents a feedback gain of a yaw rate, which interpolates the element a22 changing in accordance with increase in the vehicle speed or the nonlinear term. A term "αT" represents a feedback gain of a yaw angle acceleration, which interpolates the element a21 changing in accordance with increase in the vehicle speed or the nonlinear term. Given that output of the control loop A is named a yaw moment Mz and a yaw angle acceleration γ' is expressed by an equation 12, the yaw moment Mz can be expressed by an equation 13.

$$\gamma' = -a22 \cdot \gamma - a21 \cdot \beta b + b2 \cdot \delta f \quad \text{[Equation 12]}$$

$$Mz = -\{(\alpha A - 1)a22 \cdot \gamma + \alpha T(-a22 \cdot \gamma + a21 \cdot \beta b + b2 \cdot \delta f)\}Iz \quad \text{[Equation 13]}$$

$$= -\{(\alpha A - 1) - \alpha T\}\left\{\frac{2(lf^2 \cdot \text{ka\_f} + lr^2 \cdot \text{ka\_r})}{V}\right\}\gamma +$$

$$\alpha T\{(2(lf \cdot \text{ka\_f} - lr \cdot \text{ka\_r})\beta b + 2lf \cdot \text{ka\_f} \cdot \delta f)\}$$

Setting the feedback gain αA properly leads the feedback of the yaw rate γ to interpolate the variable component of the element a22, thus bringing the current value of the element a22 close to a target value a22', that is, the linear term of the element a22. The value of the feedback gain αA is determined so that a ratio between the value of the element a22 and the value of the element a22' (a22'/a22) stays constant. On the other hand, setting the feedback gain αT properly leads the feedback of the yaw angle acceleration γ' to interpolate the variable component of the element a21, thus bringing the current value of the element a21 close to a target value a21', that is, the linear term of the element a21. The value of the feedback gain αT is determined so that a ratio between the value of the element a21 and the value of the element a21' (a21'/a21) stays constant.

Figure 8:
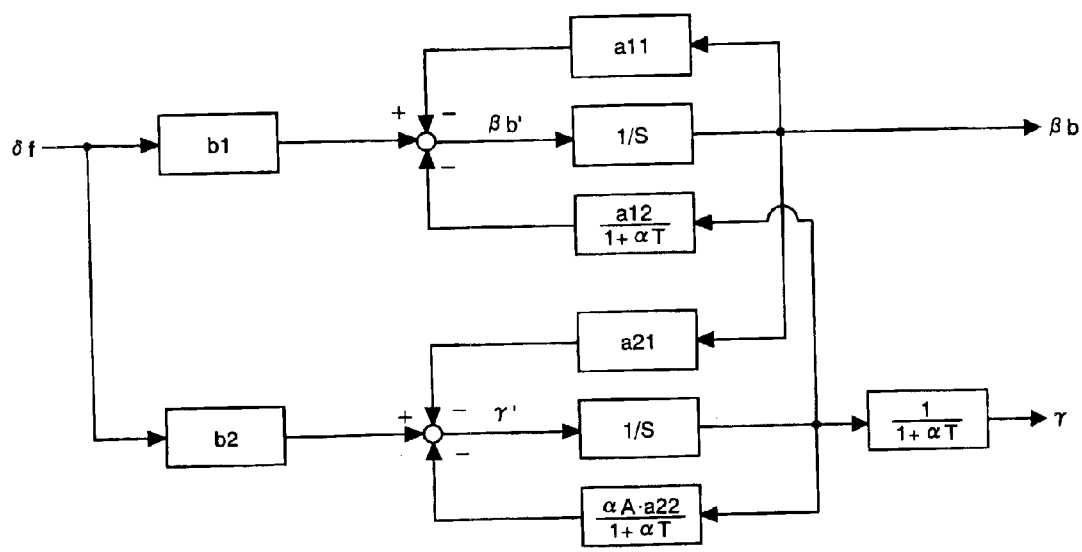
FIG. 8 is a block diagram having an equivalent relationship with the block diagram shown in FIG. 7.

The block diagram shown in FIG. 7 and a block diagram shown in FIG. 8 have an equivalent relationship. As apparent from FIG. 8, the value of the element a22 is affected by not only the feedback gain αA but also the feedback gain αT. Specifically, in a case that the value of the feedback gain αT is not "0", an actual ratio between the value of the element a22 and the value of the element a22' does not stay constant according to the effect of the feedback gain αT even if the feedback gain αA is set so that the ratio stays constant. The feedback gains αA and αT shown in FIG. 8 can be expressed by the following equation 14 including formulas (m) and (n) with use of the target values a22', a12' corresponding the linear term of the element a22, a12 respectively and the elements a22, a12.

[Equation 14]

$$a12' = \frac{a12}{1+\alpha T} \quad (m)$$

$$\therefore \alpha T = \frac{a12}{a12'} - 1$$

$$a22' = \frac{\alpha A \cdot a22}{1+\alpha T} \quad (n)$$

$$\therefore \alpha A = \frac{a22'}{a22} \cdot (1+\alpha T)$$

The value of the feedback gain αA must be derived by considering the effect of the feedback gain αT, thus complicating derivation of its optimum value. Consequently, in the present embodiment, a yaw moment Mz' applied to the vehicle is expressed by the following equation 15 by setting a term "βA" as the actual ratio between the element a22' and the a22 and substituting the formula (n) of the equation 14 to the equation 13.

[Equation 15]

$$Mz' = -\{\beta A(1+\alpha T) - 1 - \alpha T\}\left\{\frac{2(lf^2 \cdot ka\_f + lr^2 \cdot ka\_r)}{V}\right\}\gamma +$$

$$\alpha T\{(2(lf \cdot ka\_f - lr \cdot ka\_r))\beta b + 2lf \cdot ka\_f \cdot \delta f\}$$

The driving-force distribution ratio or the braking-force distribution ratio to the left and right wheels is obtained for satisfying the equation 15 based on distances from the center of gravity to the front and rear wheels, by setting the feedback gain βA, that is, "a22'/a22" and the feedback gain αT, that is, "(a12/a12')−1" and referring to a well-known formula for calculating the yaw moment Mz. By controlling the driving-force distribution ratio to the left and right wheels, changes in the values of the elements a21 and a22 are inhibited. A method of controlling the driving-force distribution ratio to the left and right wheels is disclosed for instance in the above-mentioned JP-A-8-2274, and may be referred to as if necessary.

As described above, according to the second embodiment, the variable components of the elements a21 and a22 are interpolated by adjusting the driving-force distribution ratio to the left and right wheels and adding the yaw moment to the vehicle. Accordingly, the elements a21 and a22 react in a direction toward the linear term, thus inhibiting the changes in the elements a21 and a22. Particularly, inhibiting the change in the element a22 enables correction of decrease in vehicle motion characteristics such as yaw dumping affected by the nonlinearity of a tire or increase in the vehicle speed. Additionally, inhibiting the change in the element a21 enables correction of decrease in vehicle motion characteristics such as yaw response to steering affected by the nonlinearity of the tire or increase in the vehicle speed.

A basic concept of a case regarding the elements a11 and a12 is the same as that of a case regarding the elements a2B1 and a22; and thus the details thereof are omitted. The changes in the elements a11 and a12 may be inhibited by adjusting the body sliding angle βb and thus adding the lateral translational motion. Furthermore, a process for bringing each element close to the linear term may be executed by combining the minimization of the nonlinear term according to the first embodiment and the interpolated term according to the second embodiment.

According to the present invention, a vehicle is controlled by focusing on an element of a system matrix. The element of the system matrix is expressed by a sum of a linear term and a nonlinear term, and the vehicle is controlled so that an estimated value of the element approaches the linear term. Accordingly, change in each element is inhibited, thus stabilizing a motion state of the vehicle regardless of its driving condition.

While the present invention has been disclosed in terms of the preferred embodiments in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

Additionally, the disclosure of Japanese Patent Application No. 2003-365529 filed on Oct. 27, 2003 including the specification, drawing and abstract is incorporated herein by reference in its entirety.

What is claimed is:

1. A vehicle control device for controlling a motion state of a vehicle, comprising:

an estimating unit estimating an element of a system matrix in a state equation that represents the motion state of the vehicle, based on state quantity including at least a longitudinal force applied to a wheel, a vertical force applied to the wheel and a vehicle speed;

a setting unit setting a target value regarding the element of the system matrix;

a processing unit calculating a control value so that the estimated element approaches the set target value; and a controlling unit controlling the vehicle based on the calculated control value, wherein the element is expressed by a sum of a linear term changing with linearity of the wheel and a nonlinear term changing with nonlinearity of the wheel, and the setting unit sets the linear term of the element as the target value.

2. The vehicle control device according to claim 1, wherein the processing unit calculates the control value so that the state quantity changes from its current value.

3. The vehicle control device according to claim 2, wherein the processing unit decides the control value so that an absolute value of the nonlinear term becomes its minimum value.

4. The vehicle control device according to claim 3, wherein the nonlinear term of the element is expressed by a linear sum of at least a first term that has a first coefficient including the state quantity and a variable of a yaw rate and a second term that has a second coefficient including the state quantity and a variable of a body sliding angle, and the processing unit calculates the control value so that at least one of the first coefficient and the second coefficient approaches zero.

5. The vehicle control device according to claim 4, wherein the processing unit calculates one of a driving-force distribution ratio and a braking-force distribution ratio of predetermined front and rear wheels as the control value so that a longitudinal-force distribution ratio of the front and rear wheels changes from its current value.

6. The vehicle control device according to claim 4, wherein the processing unit calculates a vertical-load distribution ratio of predetermined front and rear wheels as the control value so that a vertical-force distribution ratio of the front and rear wheels changes from its current value.

7. The vehicle control device according to claim 4, wherein the processing unit calculates a vehicle speed different from its current value as the control value.

8. The vehicle control device according to claim 2, wherein
   the nonlinear term of the element is expressed by a linear sum of at least a first term that has a first coefficient including the state quantity and a variable of a yaw rate and a second term that has a second coefficient including the state quantity and a variable of a body sliding angle, and
   the processing unit calculates the control value so that at least one of the first coefficient and the second coefficient approaches zero.

9. The vehicle control device according to claim 2, wherein the processing unit calculates one of a driving-force distribution ratio and a braking-force distribution ratio of predetermined front and rear wheels as the control value so that a longitudinal-force distribution ratio of the front and rear wheels changes from its current value.

10. The vehicle control device according to claim 2, wherein the processing unit calculates a vertical-load distribution ratio of predetermined front and rear wheels as the control value so that a vertical-force distribution ratio of the front and rear wheels changes from its current value.

11. The vehicle control device according to claim 2, wherein the processing unit calculates a vehicle speed different from its current value as the control value.

12. The vehicle control device according to claim 2, wherein the processing unit calculates the control value so that an interpolated term is generated in the element for balancing out a variable component corresponding difference between the element and its target value.

13. The vehicle control device according to claim 12, wherein the processing unit calculates one of a driving-force distribution ratio and a braking-force distribution ratio of predetermined left and right wheels as the control value so that a longitudinal-force distribution ratio of the left and right wheels changes from its current value.

14. The vehicle control device according to claim 1, wherein the processing unit decides the control value so that an absolute value of the nonlinear term becomes its minimum value.

15. The vehicle control device according to claim 14, wherein
   the nonlinear term of the element is expressed by a linear sum of at least a first term that has a first coefficient including the state quantity and a variable of a yaw rate and a second term that has a second coefficient including the state quantity and a variable of a body sliding angle, and
   the processing unit calculates the control value so that at least one of the first coefficient and the second coefficient approaches zero.

16. The vehicle control device according to claim 1, wherein
   the nonlinear term of the element is expressed by a linear sum of at least a first term that has a first coefficient including the state quantity and a variable of a yaw rate and a second term that has a second coefficient including the state quantity and a variable of a body sliding angle, and
   the processing unit calculates the control value so that at least one of the first coefficient and the second coefficient approaches zero.

17. The vehicle control device according to claim 1, wherein the processing unit calculates the control value so that an interpolated term is generated in the element for balancing, out a variable component corresponding difference between the element and its target value.

18. The vehicle control device according to claim 17, wherein the processing unit calculates one of a driving-force distribution ratio and a braking-force distribution ratio of predetermined left and right wheels as the control value so that a longitudinal-force distribution ratio of the left and right wheels changes from its current value.

19. A vehicle control method for controlling a motion state of a vehicle, comprising:
   a first step of estimating an element of a system matrix in a state equation that represents the motion state of the vehicle, based on state quantity including at least a longitudinal force applied to a wheel, a vertical force applied to the wheel and a vehicle speed;
   a second step of setting a target value regarding the element of the system matrix;
   a third step of calculating a control value so that the estimated element approaches the set target value; and
   a fourth step of controlling the vehicle based on the calculated control value, wherein
   the element is expressed by a sum of a linear term changing with linearity of the wheel and a nonlinear term changing with nonlinearity of the wheel, and the second step includes a step of setting the linear term of the element as the target value.

20. The vehicle control method according to claim 19, wherein the third step includes a step of calculating the control value so that the state quantity changes from its current value.

21. The vehicle control method according claim 20, wherein the third step includes a step of deciding the control value so that an absolute value of the nonlinear term becomes its minimum value.

22. The vehicle control method according to claim 20, wherein
   the nonlinear term of the element is expressed by a linear sum of at least a first term that has a first coefficient including the state quantity and a variable of a yaw rate and a second term that has a second coefficient including the state quantity and a variable of a body sliding angle, and
   the third step includes a step of calculating the control value so that at least one of the first coefficient and the second coefficient approaches zero.

23. The vehicle control method according claim 19, wherein the third step includes a step of deciding the control value so that an absolute value of the nonlinear term becomes its minimum value.

24. The vehicle control method according to claim 23, wherein
   the nonlinear term of the element is expressed by a linear sum of at least a first term that has a first coefficient including the state quantity and a variable of a yaw rate and a second term that has a second coefficient including the state quantity and a variable of a body sliding angle, and the third step includes a step of calculating the control value so that at least one of the first coefficient and the second coefficient approaches zero.

25. The vehicle control method according to claim 19, wherein the nonlinear term of the element is expressed by a linear sum of at least a first term that has a first coefficient including the state quantity and a variable of a yaw rate and a second term that has a second coefficient including the state quantity and a variable of a body sliding angle, and the third step includes a step of calculating the control value so that at least one of the first coefficient and the second coefficient approaches zero.

26. The vehicle control method according to claim 19, wherein the third step includes a step of calculating the control value so that an interpolated term is generated in the element for balancing out a variable component corresponding to difference between the element and its target value.

* * * * *